April 21, 1964  J. E. TILLMAN  3,129,892
PRESSURE REDUCING BLOW GUN
Filed June 26, 1961  2 Sheets-Sheet 1
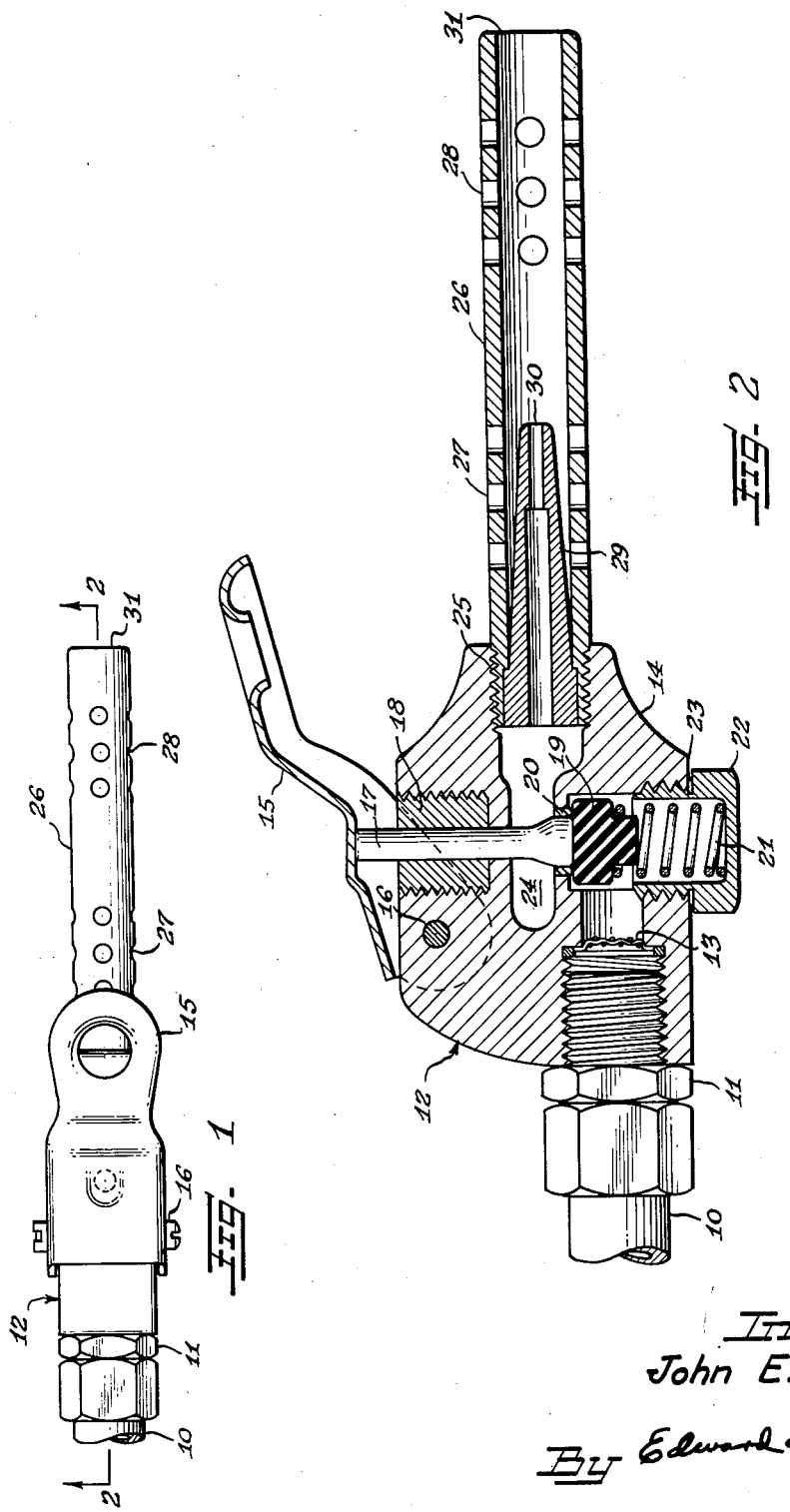
Inventor
John E. Tillman
By Edward L. Amonette
Agent

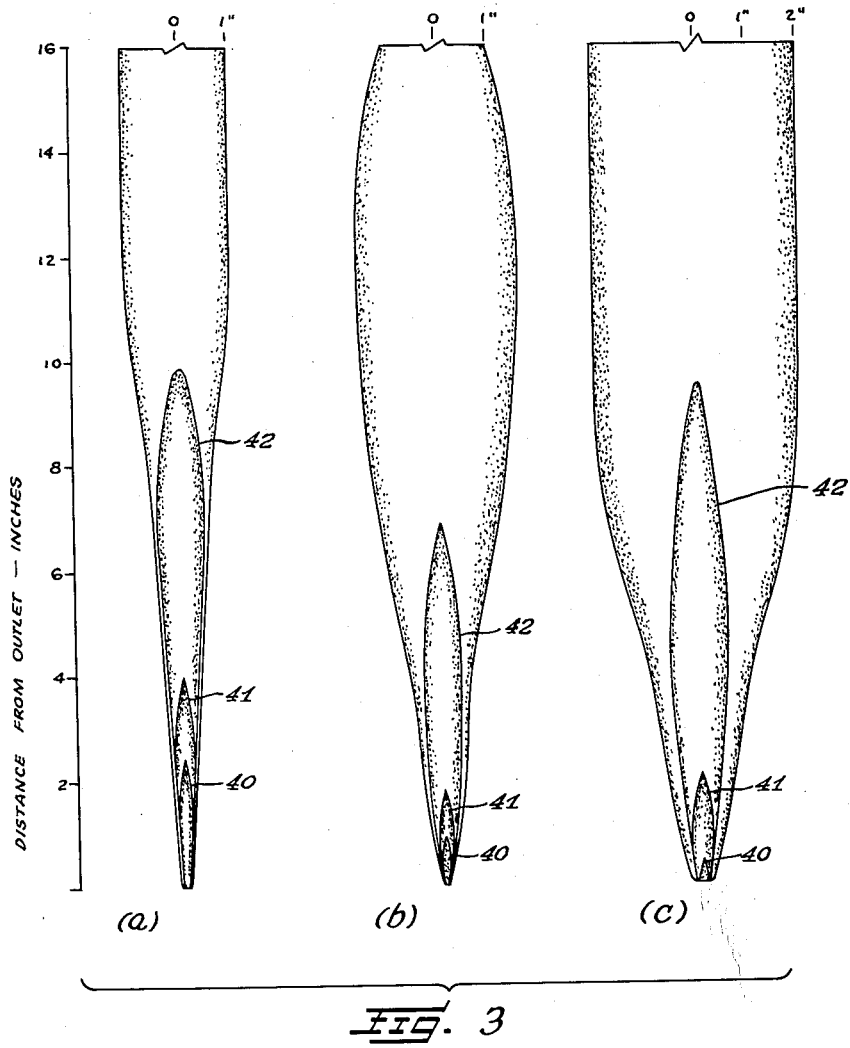
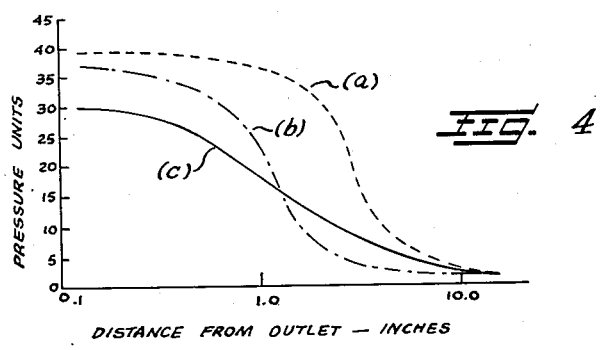
Fig. 3
Fig. 4
Inventor
John E. Tillman
By Edward L. Amonette
Agent

3,129,892
PRESSURE REDUCING BLOW GUN
John E. Tillman, 305 Tulane Drive SE.,
Albuquerque, N. Mex.
Filed June 26, 1961, Ser. No. 119,582
3 Claims. (Cl. 239—407)

My invention relates generally to blow guns, and more particularly to a blow gun which reduces the line pressure to a safe level which cannot be increased through unsafe practices.

Compressed air is widely used as a power source in industry, a pressure of 85–100 p.s.i. being furnished by a compressor to various air-powered instruments such as jackhammers, riveting guns, and other pneumatic tools. Also, workmen have found that a stream of compressed air is useful in removing dust, metal chips and the like from work benches and from pieces on which tooling operations are being performed. To satisfy the need for a dusting device, various blow guns have been devised, most of them including a manually operated valve and a nozzle with an aperture approximately 1/16 inch in diameter. As generally used the blow gun is attached to the compressed air supply of 85–100 p.s.i., sometimes interchangeably with the pneumatic tools mentioned above. When the workman wishes to dust, he manually opens the valve and aims the gun to direct a high-velocity, low-volume stream of air toward the object to be dusted. Lightweight particles of dust, metal chips and the like which are struck by the air stream are accelerated thereby and fly off in various directions through the air.

Obviously, dusting by this means is a very unsafe practice and there have been many injuries attributed to flying particles being lodged in workmen's eyes and in other parts of their bodies. Other injuries result when the orifice of a blow gun is, as a practical joke, pushed against a workman's body or into one of his body openings. The high-pressure stream of air will pass through the epidermis and into the blood stream, with the consequent air bubbles in the blood sometimes causing immediate death.

Safety engineers have long recognized the hazards of blow guns with the result that in some manufacturing plants their use is forbidden. One expensive solution to the problem is to install a separate, low-pressure, line throughout the manufacturing plant for connection to dusting blow guns only. The air for this line may be supplied from a separate low-pressure blower, or from a pressure-reducing regulator installed on a branch of the high-pressure line.

Another solution, also expensive, is to install a pressure reducer in the compressed air line leading to each blow gun. By reducing the pressure of the air supplied to the blow gun to approximately 15 p.s.i. the blow gun is made into a comparatively safe device, since air at that pressure does not force its way into the epidermis, and since loose particles do not assume such a high velocity that they are dangerous. Besides the high expense of such an installation, this attempted solution to the problem has the disadvantage that nearly all regulators are adjustable, and the workmen often get into the habit of resetting the pressure upward to a dangerous level without the knowledge of the safety engineer, so that a greater volume of air can be obtained for dusting. Also, when the pressure is reduced to a safe level within the blow gun air line, this restricts the use of the airline to blow guns only, since other pneumatic tools must have the higher pressure in order to operate correctly.

In my invention I have provided a safety pressure reducing blow gun at only a slight increase in cost over that of a standard blow gun. My invention is designed to safely reduce the line pressure from 100 p.s.i. to less than 3 p.s.i. at the outlet, while at the same time increasing the volume of air flow by aspiration. In addition, a broader stream of air is provided so that dusting or drying operations can be performed more easily, and the velocity of the air is considerably less than it is with a conventional blow gun. Compared with a blow gun of the prior art operated at 15 p.s.i. pressure, my invention supplies almost the same pressure at the outlet, and more pressure at a distance of several inches from the outlet, the pressure still being considerably lower than that observed at the same distance from the old style blow gun powered by 100 p.s.i. line pressure. Due to the unique construction of my blow gun the pressure reduction cannot be nullified by unsafe operators, and the outlet can be applied directly to a workpiece or to a person's body without pressure build-up and possible injury. Since my invention operates directly from the high-pressure line, it is interchangeable with other pneumatic tools, no special lines being necessary for its use.

Briefly, my invention includes the usual inlet for a compressed gas and a manually operated valve, plus a hollow conductor for the compressed gas which is released within the conductor for a nozzle orifice similar in size to the orifice found in the older blow guns. The hollow conductor has an outlet bore which is many times greater in diameter than is the orifice. This allows great expansion of the compressed gas before it leaves the blow gun, with a consequent inversely proportional reduction in pressure. The hollow conductor has two sets of perforations along its length, the first or upstream set of perforations being located generally upstream of the internal orifice at the vacuum portion of a venturi formed between the conductor and the nozzle for the purpose of aspirating air from the environment into the hollow conductor. Thus, more air leaves the conductor outlet than leaves the orifice from the compressed air line. The second or downstream set of perforations is located between the orifice and the outlet of the conductor, preferably closer to the outlet than to the orifice, so that if the outlet is blocked both the aspirated air and the air released from the orifice can leave the conductor by means of this set of perforations rather than building up a pressure at the outlet.

A better understanding of my invention may be had by reading the more detailed description to follow in conjunction with the claims and the attached drawing, in which:

FIG. 1 is a top view of a preferred embodiment of my invention;

FIG. 2 is an enlarged longitudinal sectional view of the same embodiment taken along the line 2—2 in FIG. 1;

FIG. 3 shows pressure patterns produced by prior blow guns, compared with the pattern produced by my invention; and FIG. 4 is a comparative plot of pressures observable at different distances from the outlets of prior blow guns and of the present invention.

Referring now to FIGS. 1 and 2, compressed air or other gas is supplied through line 10 and coupling 11 to blow gun 12. Screen 13 is normally provided to filter out any large particles of matter which may have entered the air stream.

Body 14 of the blow gun holds the various parts including manually operated lever 15 which is pivotally mounted at 16. When depressed the lever operates valve stem 17 through bushing 18, depressing rubber valve 19 from its seat 20. Either the valve or its seat, or both, may be made of a resilient material such as rubber for a tight seal. The seal is maintained by pressure from coil spring 21 when lever 15 is not depressed. Nut 22 and gasket 23 hold the spring in place and prevent loss of compressed air. When valve 19 is unseated, compressed air is allowed to pass through the aperture between the narrowed portion of valve stem 17 and seat 20, into chamber 24. The chamber is threaded at 25 to receive tube 26 which is a hollow conductor for the compressed air admitted to the chamber.

Tube 26 is seen to have two longitudinally spaced sets of perforations, at 27 and 28. Frusto-conical nozzle 29 is mounted coaxially within the upstream end of the tube, with orifice 30 centered in the frustum. The nozzle is shaped to provide a smooth transition from the internal diameter of tube 26 to the diameter of orifice 30. The frusto-conical shape is used because it is easy to machine. Other shapes, such as logarithmic taper, are satisfactory as long as a venturi is formed between the nozzle and the tube. By venturi action the air escaping from the nozzle orifice creates a partial vacuum in the region of perforations 27, aspirating outside air into the tube through the perforations. Slight aspiration also occurs through perforations 28. The combined quantity of air flows through the tube and is released to the outside through the outlet end 31 of the tube.

Orifice 30 is shown ending near the edge of the last perforation of set 27, its exact location depending on the ratio of orifice diameter to the diameter of the outlet bore of the tube, and on the line pressure. In some instances it will be preferable to locate the orifice within the region of perforations 27 to secure the correct venturi action. In all instances the orifice will be in the vicinity of the end of set 27.

By constructing my blow gun so that the outlet bore of tube 26 has an effective area at least thirty times the effective area of orifice 30 while perforation sets 27 and 28 each have areas equal to the outlet bore area, a 33:1 reduction of pressure from line 10 to outlet end 31 is achieved. Changing any of the areas involved will change the reduction ratio. Thus, a pressure of 3 p.s.i. can be measured at 31 when the tube is blocked and when the blow gun is operated from 100 p.s.i. Blocking of the tube does not cause a pressure buildup, because air emitted from orifice 30 passes out through perforations 28 as safety vents. Perforations 27 also can act as safety vents if necessary, with a resultant higher pressure at 31.

The only way in which a workman can create an unsafe device from my blow gun is to seal all perforations 27 and 28. Such a sealing would immediately become obvious to the workman's supervisor and be corrected. When the blow gun is correctly used, outlet end 31 can be placed safely against a person's body without damage thereto, since a pressure of only 3 p.s.i. will be experienced.

FIG. 3 shows isobaric maps of pressure patterns obtained from various types of blow guns. The pattern of FIG. 3a is that of a typical blow gun having a simple 1/16 inch outlet opening directly into the atmosphere and operating from 85 p.s.i. line pressure. It shows a pressure pattern having a terminal width of approximately two inches, with high pressure extending several inches outward from the orifice.

FIG. 3b is for the same type of blow gun operated from a line pressure of 15 p.s.i. The pressure pattern is seen to increase slightly in diameter, while the pressure several inches from the orifice has decreased considerably.

The pressure pattern produced by my invention operating at 85 p.s.i. line pressure is shown in FIG. 3c. The isobar 40 representing the highest pressure extends only a fraction of an inch from the outlet, compared with an extension of approximately one inch in FIG. 3b and in excess of two inches in FIG. 3a. The isobar 41 for the next decreasing level of pressure extends about the same distance from the outlet as it does in FIG. 3b, but about half the distance of the same isobar in FIG. 3a. Thus, my blow gun is safer for close blowing operations since it produces a lower pressure near its outlet.

The next isobar 42, which represents the most useful pressure level for dusting, extends at least two inches further from the outlet than it does in FIG. 3b, and the pattern is wider. The extension is almost the same as for isobar 42 in FIG. 3a. It is seen, then, that my invention is comparable to the older type blow gun operating at 85 p.s.i., at the distance and pressure level corresponding to usual dusting practice. It is superior to the same prior gun operating at 15 p.s.i.

The extreme limits of the pattern of FIG. 3c are seen to be four inches in diameter compared with two inches in each of the preceding cases. At distances greater than ten inches from the outlet, the air stream is commonly used for drying purposes so it is seen that the wide pattern produced by my invention is much more desirable for fast drying of large surfaces than would be the narrow patterns of FIGS. 3a and 3b.

In FIG. 4 the data used in plotting FIG. 3 is replotted as linear pressure units versus axial logarithmic distance from outlet in inches. Curve 3a corresponds to a prior art blow gun operating at 85 p.s.i., curve b is for the same blow gun operating at 15 p.s.i.; and curve c represents pressures measured in the air stream from my invention operating at 85 p.s.i. My invention is seen to supply a safer reduced pressure near the outlet, but at distances greater than one inch from the outlet it supplies more pressure than is supplied by the older type blow gun operating at 15 p.s.i.

I have described an improved safety pressure-reducing blow gun which can be made for approximately one-tenth the cost of a reduced pressure installation for the prior art blow gun having a simple orifice. The preferred embodiment of my invention has been shown and described without intent of limiting my patent protection thereto, the sphere and scope of my invention being defined by the claims below.

I claim as my invention:

1. In a pressure reducing blow gun including an inlet for compressed gas and a valve for controlling the entry of compressed gas from said inlet to the gun, outlet means for discharge of compressed gas from the gun comprising: a tube having an inner end and an outer end provided with a discharge opening therethrough for discharge of compressed gas from the gun; a nozzle mounted within the inner end of said tube extending a distance axially thereinto and being provided at its inner end with a discharge orifice for discharge of compressed gas therethrough into said tube; said nozzle being formed and mounted to receive compressed gas from said valve for discharge through said orifice and being shaped to form in combination with said tube a venturi therearound within said tube; said tube being provided with a first set of perforations therethrough spaced apart therearound and spaced apart longitudinally therealong in the region of and around said venturi for aspiration of air therethrough into said tube by the action of said venturi; said nozzle being mounted with said discharge orifice thereof located within that portion of the interior of said tube surrounded by said first set of perforations; said tube being provided with a second set of perforations independent of said first set of perforations and being located adjacent said discharge in the outer end of said tube; and said second set of perforations being spaced a distance longitudinally along said tube remote from and independent of said first set of perforations for aspiration of air into said tube adjacent the discharge end of the latter by the flow of compressed gas through said tube and for pressure releasing reverse flow of compressed gas outwardly therethrough upon blocking of said discharge from said tube.

2. In the combination of claim 1, the cross-sectional area of the outer end discharge of said tube being at least thirty (30) times the cross-sectional area of said discharge orifice of said nozzle.

3. In the combination of claim 1, the combined areas of the perforations of said first set of perforations and the combined areas of the perforations of said independent second set of perforations being each approximately equal to the cross sectional area of the outer end discharge of said tube.

References Cited in the file of this patent

UNITED STATES PATENTS

| | | |
|---|---|---|
| 605,049 | Nicholsburg | May 31, 1898 |
| 2,138,133 | Betzler | Nov. 29, 1938 |
| 2,382,688 | Wilson | Aug. 14, 1945 |
| 2,645,528 | Thorsen | July 14, 1953 |
| 2,940,674 | Hanje et al. | June 14, 1960 |

FOREIGN PATENTS

| | | |
|---|---|---|
| 17,649 | Germany | of 1882 |